Patented Jan. 1, 1952

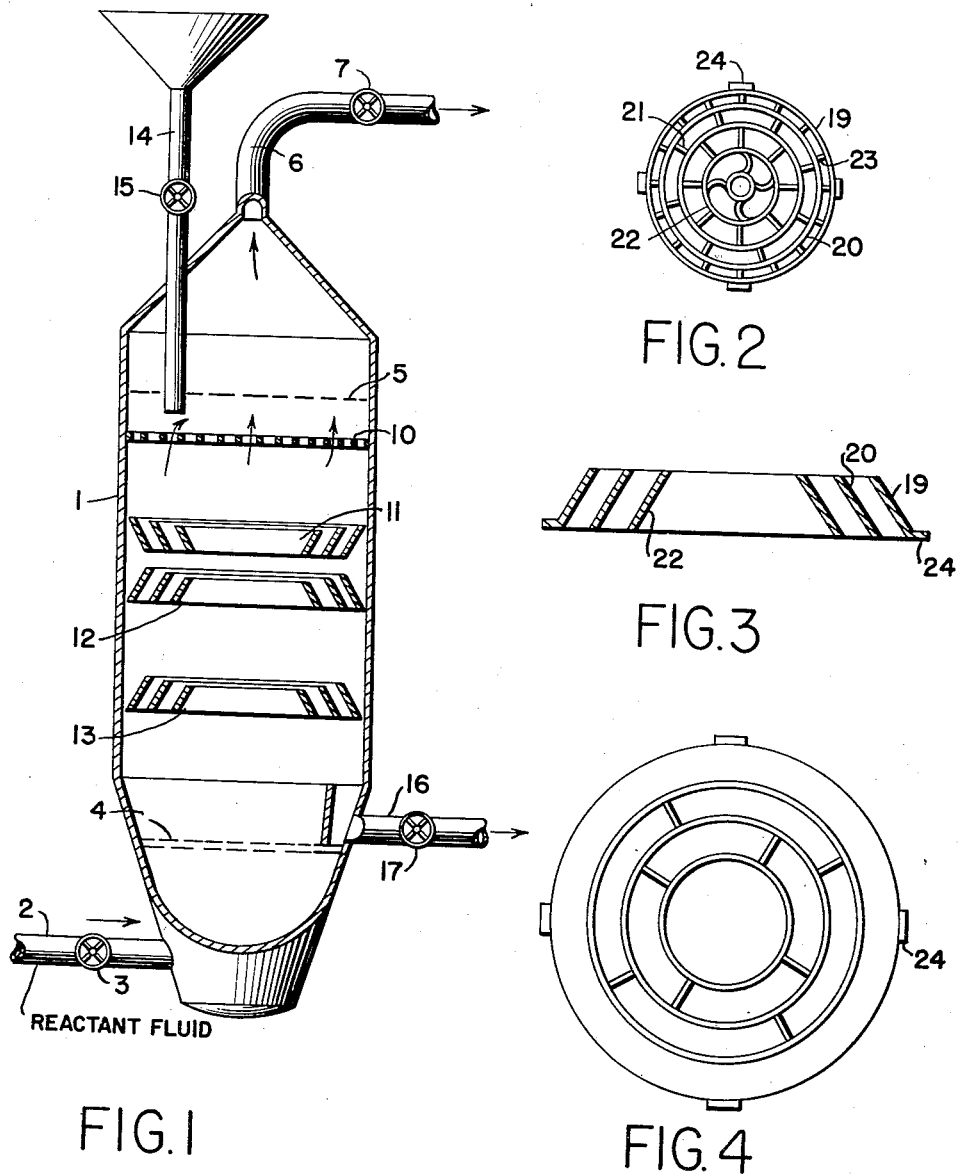

2,581,134

UNITED STATES PATENT OFFICE 2,581,134

APPARATUS FOR CONTACTING SOLIDS AND GASES

William W. Odell, Washington, D. C., assignor to Standard Oil Development Company, a corporation of Delaware Application March 15, 1947, Serial No. 734,940

3 Claims. (Cl. 183—4.2)

This invention relates to a process and an apparatus for effecting intimate contact between gases and solids. It relates in particular to the fluidization of a mass of finely divided solids by passing a gaseous stream upwardly therethrough at such a velocity that the particles of which said mass is comprised are maintained in a state of controlled ebullient motion to effect improved contact between the gaseous fluid and the solids. Still more specifically, this invention relates to the passage of a gasiform fluid upwardly through a bed of finely divided solids, under conditions which will maintain the solids in a fluidized state and at the same time reduce or prevent back circulation or back mixing of the gasiform fluid and the solids in the contacting zone.

It has been found, for example, that when a hydrocarbon in the vaporous phase is passed upwardly through a bed of confined, finely divided catalyst at a cracking temperature all of the cracked products formed do not immediately leave the confined catalyst bed. A portion of the products is recirculated in the ebullient motion in said bed and contacts the solids for a prolonged period of time. In other words, the hydrocarbon vapors do not pass up through the fluidized bed of catalyst solids in vertical parallel paths, but a substantial portion is recirculated back downwardly through the bed. This back circulation of reaction products with the resulting prolonged time of contact with the catalyst solids, due to ebullient motion, causes an excessive degradation into low-grade products, such as coke and gas.

One of the objects of this invention is to provide means to reduce the back circulation of gaseous material in the contacting zone.

Another object is to maintain better mixing of the solids in the fluidized bed. A further object is to prevent the formation of large gas pockets which cause surging or slugging of the powder in the reactor.

Still another object is to reduce the amount of carbon deposit on cracking catalyst used in the cracking of hydrocarbon materials.

Other more specific objects will be apparent from the detailed description hereinafter.

It has been found, when employing fluidized solids technique wherein gases are contacted with a relatively dense, turbulent bed of finely divided solids, that for solids having a given state of subdivision there is a limiting relationship between the depth of the bed and the diameter of the contacting zone. For example, when the bed is deeper than the limiting depth defined by tube-diameter and particle size, large slugs of powder are formed which surge up and down the contacting zone. This slugging and surging results from large pockets or bubbles of gas passing upwardly and carrying slugs of solids ahead of them. This condition is undesirable, since it destroys the otherwise intimate contact between the powder and gas.

In accordance with the present invention, I prevent back circulation of the gas and avoid slugging which would otherwise occur in deep, narrow contacting zones by providing specially designed deflecting, open-mesh, horizontal baffles or grids spaced longitudinally of the contacting zone.

The invention will be best understood by reference to the accompanying drawing wherein Fig. 1 shows partly diagrammatically and partly schematically one type of apparatus, in elevation, in which the process defined herein can be practiced;

Fig. 2 is a top view of one type of grid baffle adapted to be used in the contacting zone;

Fig. 3 shows a vertical sectional view of a different type of baffle having three connected concentric circular elements; and Fig. 4 is a top view of the type of baffle shown in Fig. 3.

In the operation of the process, it may be said in general that the known practice employing fluidized solids technique is followed. Referring to Fig. 1, a bed of catalyst solids in a fine state of subdivision is fluidized in reactor 1 by introducing a reactant fluid through conduit 2 and valve 3 at a velocity such that the said solids which are supported on porous grid support 4 assume ebullient motion and the properties of a liquid having upper level indicated at 5. The reactant fluid passes out overhead through offtake 6 having control valve 7. Baffles are shown at 10, 11, 12 and 13. A stream of finely divided solids may be introduced into the reactor 1 either continuously or intermittently through conduit 14 having a control valve 15. A similar stream of powder is withdrawn from the bottom of the reactor above the grid 4 through conduit 16 having a control valve 17. If desired, a part or all of the powder withdrawn through line 16 may be recirculated to the top in any desired manner (not shown). Furthermore, the stream of powder before being returned may be regenerated or it may be heated or cooled to add heat to or extract heat from the reactor.

The baffles or grids may take the form of the grid illustrated at the top of Fig. 1 and Fig. 2 or in the form of radially deflecting baffles illustrated in the lower portion of Fig. 1 and in Figs. 3 and 4. The grid illustrated in Fig. 2 may comprise a plurality of spaced rings 19, 20, 21 and 22 separated by radially extending spacing elements 23. This grid should have a minimum of open space amounting to at least 50% of the cross-sectional area of the reactor, and preferably 75% or 90% or more. By providing an open-mesh grid of this type, no substantial resistance is offered to the flow of the gases upwardly through the grid. As a result, there is no phase separation of the bed into separate layers within the reactor. The annular members and the spacing elements, however, tend to prevent formation of large gas pockets and also assist in preventing back circulation of the reactant gases downwardly through the grid.

Referring to Figs. 3 and 4, the baffle may comprise a plurality of spaced rings or flanges disposed at an angle to the axis of the reactor so as to divert or deflect the mixture of fluids and gases either inwardly toward the center of the reactor or outwardly toward the circumference. The angle of the flanges with respect to the axis should be greater than the angle of respose of the powdered material so as to prevent the powder from accumulating on the upper surface of the annular members. The annular deflecting baffle illustrated in Figs. 3 and 4 should also have sufficient open spaces to offer little, if any, resistance to the flow of gases upwardly through the reactor. The grids or baffles may be secured to the wall of the reactor 1 in any suitable manner. For example, as shown in Figs. 2 and 4, the outer ring may be provided with horizontal flanges or tabs 24 which may be welded or otherwise secured to the wall of the reactor.

In Fig. 1 there are shown two spaced deflecting baffles 11 and 12 superimposed one above the other so that the lower deflecting baffle deflects the material toward the center of the reactor, whereas the upper baffle tends to deflect the material toward the outer walls of the reactor. This type of arrangement materially assists in reducing the amount of back mixing of the gases and assures a more intimate contact between the gases and solids.

In ordinary practice, without baffles, the same degree of fluidization is not obtained throughout the full cross-sectional area of the reactor. The solids travel throughout the bed rapidly from top to bottom and back in swirling motion. As the solids travel in this swirling motion, eddy currents are formed which carry some of the gaseous reactants from the top back into the lower portion of the bed. Again, as the velocity of flow of the reactant fluid up through the bed increases, a point is reached where slug flow occurs and uniform contact of solids with the fluid no longer prevails. This critical point is reached at different velocities for different materials and different sizes of materials fluidized. For a given material the relation of the depth of the bed which may be used satisfactorily is a quite definite multiple of the diameter, and it is also related to the viscosity of the fluidized mass. This slugging does not occur when the depth of the bed is not greater than approximately three times the diameter. When employing the same velocity of flow of the fluid stream in the reactor with the same diameter as in the foregoing case, but with an appreciably deep bed, namely, a bed six times as deep as its diameter, it has been found that a baffle such as is shown in Fig. 2 placed substantially midway between top and bottom of the fluidized bed prevents slugging and materially reduces back mixing of the gases. By using a plurality of such baffles, additional benefits are obtained and the per cent of open or free space in the baffles may be larger than when one baffle only is used. When it is merely desirable to minimize wall effect, a baffle of the type shown in Figs. 3 and 4 may be employed. In this instance, the open space in the baffle may be very great. When it is particularly desirable to retard the downward travel of the solids in the reactor, the baffles such as shown in Figs. 3 and 4 may be used in multiples. These baffles may be so arranged in the reactor to deflect the solids alternately inwardly and outwardly as shown by baffles 11 and 12 of Fig. 1, as previously described.

When employing a plurality of grid baffles in the fluidized bed of the type previously described and preferably spaced apart from one another, the particles of solids fed into the bed at the top are retarded in their downward travel by virtue of the said baffles so that they approach a condition where all of the particles withdrawn through conduit or offtake 16 have a common residence time in the reactor 1. The duration of residence time is controlled by regulating the rate of feed of solids through the reactor by means of valves 16 and 17. Summarily, it may be said that the baffles perform the following functions:

(a) They retard and break up downward-swirling eddy currents of the fluidized solids and gas.

(b) They retard the travel of the solids from the top to the bottom of the fluidized bed.

(c) They insure a more truly countercurrent flow of solids and gas in the reactor and thus reduce intermixing of freshly charged solids with solids about to be withdrawn from the fluidized bed and back mixing of gases downwardly through the reactor.

(d) They tend to prevent slugging in cases where relatively deep beds are used.

(e) They decrease the tendency for the finer size particles of solids to be entrained in the fluid stream as it passes out through the top of the fluidized bed.

One application of the invention is in the selective absorption of constituents from a mixed gas stream. In such a process it is desirable that the relatively lean gases leaving the top of the absorber contact the relatively fresh absorbent material so as to obtain more efficient and complete absorption of the constituents. It is also desirable in many cases that the individual particles of absorbent material be maintained within the absorber for a uniform period. This latter makes it possible to selectively control the nature of the materials absorbed. For example, in treating a natural gas for removal of natural gasoline it is desirable in some cases to remove only the pentane and higher boiling hydrocarbons, whereas in other cases it may be desirable to remove also the butane and perhaps some of the propane from the gas. This can be most effectively accomplished by insuring that the absorbent medium be retained in the abosrber for a uniform period of time rather than by a widely varying period of time, as in the case of a highly turbulent fluidized bed of absorbent material. The provision of the baffles in sufficient number within the absorber insures a more truly countercurrent flow and also to a considerable degree insures that the absorbent material be retained within the absorber for a more uniform period of time.

The rate of flow of the absorbent solids downwardly through the absorber is controlled to obtain the required degree of saturation of the particles discharging through line 16. The particles so removed may thereafter be passed to a suitable desorber which may be of a construction similar to that illustrated in Fig. 1 in which the solids are treated with a second stream of gas or subjected to elevated temperature to effect a liberation of the gases absorbed. The desorbed particles may again be passed into the top of the absorber through line 14 having control valve 15.

It has previously been mentioned that the open free space in the grids should be equal to 50% or more of the total cross-sectional area of the grid or baffles. It has been found, for example, that, when the open spaces in the baffles are relatively small as compared with the closed area, there is a tendency for the fluidized particles to segregate into separate layers on opposite sides of the baffles or grids. When this happens, the effective volume of the reactor is reduced. The angle of the deflecting walls from the horizontal should be at least 40° and preferably greater than 45° in order to prevent the powder settling on the upper surface thereof.

While the drawings illustrate a countercurrent type of reactor in which the powder passes downwardly countercurrently to the rising gas, it will be understood that the powder may be introduced into the bottom of the reactor either in admixture with the gas or independently thereof. The powder may also be introduced at an intermediate point in the reactor. The powder may be withdrawn either from the top, bottom or intermediate portion of the reactor. In the latter two cases the powder is withdrawn separately from the gas, and in the first case the powder may be withdrawn separately or jointly with the gas.

This invention has many applications other than those discussed.

Having described the preferred embodiment of my invention, it will be understood that it embraces such other variations and modifications as come within the spirit and scope thereof.

I claim:

1. An apparatus for contacting solids and gases which comprises an outer shell forming an enclosed vessel adapted to contain a body of subdivided solids, single means for introducing a stream of gas into the bottom of said vessel at a velocity adjusted to maintain said solids in a dense turbulent fluidized state, means for distributing the gas so introduced over the full horizontal area of said vessel, means for withdrawing a stream of gas from the upper portion of said vessel, a horizontal baffle disposed within said vessel, said baffle comprising a plurality of annular members disposed at an angle to the axis of said vessel greater than the angle of repose of the subdivided solids to thereby deflect the gases rising therethrough and prevent the subdivided solids from accumulating upon the upper surfaces of said annular members, and spacing elements separating said annular members.

2. An apparatus for contacting solids and gases which comprises an outer shell forming an enclosed vessel adapted to contain a body of subdivided solids, means for introducing a stream of said subdivided solids into the upper portion of said vessel, means to remove a stream of said solids from the lower portion of said vessel, separate single means for introducing a stream of gas into the bottom portion of said vessel at a velocity adjustable to maintain said solids in a dense turbulent fluidized state, means for distributing the gas so introduced over the full horizontal area of said vessel, means for withdrawing a stream of gas from the upper portion of said vessel, and a horizontal baffle disposed within the lower portion of said vessel comprising a plurality of annular members having spacing elements therebetween said annular members being disposed at an angle to the axis of the vessel greater than the angle of repose of the subdivided solids.

3. An apparatus for contacting solids and gases which comprises an outer shell forming an enclosed vessel adapted to contain a body of subdivided solids, means for introducing a stream of said subdivided solids into the upper portion of said vessel, means for removing a stream of said solids from the lower portion of said vessel, separate means for introducing a stream of gas into the bottom portion of said vessel at a velocity adjusted to maintain said solids in a dense turbulent fluidized state, means for distributing the gas so introduced over the full horizontal area of said vessel, means for withdrawing a stream of gas from the upper portion of said vessel, and a plurality of vertically spaced coacting horizontal baffles disposed in said vessel for controlling the flow of fluidized solids therein each of said baffles comprising a plurality of annular members disposed at an angle to the axis of the vessel greater than the angle of repose of the subdivided solids and spacing elements separating said annular members.

WILLIAM W. ODELL.

REFERENCES CITED

The following references are of record in the file of this patent:

UNITED STATES PATENTS

| Number | Name | Date |
|---|---|---|
| 1,873,783 | Osterstrom et al. | Aug. 23, 1932 |
| 2,270,903 | Rudbach | Jan. 27, 1942 |
| 2,344,449 | Ogorzaly | Mar. 14, 1944 |
| 2,351,793 | Voorhees | June 20, 1944 |
| 2,370,816 | Schonberg | Mar. 6, 1945 |
| 2,394,814 | Snuggs | Feb. 12, 1946 |
| 2,447,116 | Collins | Aug. 17, 1948 |
| 2,461,958 | Bonnell | Feb. 15, 1949 |
| 2,492,349 | Beck et al. | Dec. 27, 1949 |
| 2,495,842 | Gilliland | Jan. 31, 1950 |

FOREIGN PATENTS

| Number | Country | Date |
|---|---|---|
| 574,892 | Great Britain | Jan. 24, 1946 |